(12) United States Patent
Craig et al.

(10) Patent No.: US 8,601,073 B2
(45) Date of Patent: Dec. 3, 2013

(54) METHODS, SYSTEMS, AND COMPUTER READABLE MEDIA FOR SOURCE PEER CAPACITY-BASED DIAMETER LOAD SHARING

(75) Inventors: Jeffrey Alan Craig, Durham, NC (US); Mark Edward Kanode, Apex, NC (US); David Michael Sprague, Raleigh, NC (US); Donald E. Wallace, Evergreen, CO (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 188 days.

(21) Appl. No.: 13/026,031

(22) Filed: Feb. 11, 2011

(65) Prior Publication Data
US 2011/0202604 A1    Aug. 18, 2011

Related U.S. Application Data

(60) Provisional application No. 61/304,310, filed on Feb. 12, 2010.

(51) Int. Cl.
*G06F 15/16*    (2006.01)

(52) U.S. Cl.
USPC ........... 709/206; 709/220; 709/224; 709/228; 370/248; 370/389

(58) Field of Classification Search
USPC ........... 709/206, 220, 224, 228; 370/248, 389
See application file for complete search history.

(56) References Cited

U.S. PATENT DOCUMENTS

| | | |
|---|---|---|
| 5,228,083 A | 7/1993 | Lozowick et al. |
| 5,719,861 A | 2/1998 | Okanoue |
| 6,157,621 A | 12/2000 | Brown et al. |
| 6,273,622 B1 | 8/2001 | Ben-David |
| 6,304,273 B1 | 10/2001 | Bonnet |
| 6,584,073 B1 | 6/2003 | Steele, Jr. et al. |
| 6,795,456 B2 | 9/2004 | Scaggs |

(Continued)

FOREIGN PATENT DOCUMENTS

| | | |
|---|---|---|
| CA | 2 716 544 A1 | 12/2010 |
| EP | 1 134 939 A1 | 9/2001 |

(Continued)

OTHER PUBLICATIONS

Final Official Action for U.S. Appl. No. 12/906,816 (Feb. 21, 2012).

(Continued)

*Primary Examiner* — Khanh Dinh
(74) *Attorney, Agent, or Firm* — Jenkins, Wilson, Taylor & Hunt, P.A.

(57) ABSTRACT

Methods, systems, and computer readable media for source peer capacity-based Diameter load sharing are disclosed. According to one aspect, the subject matter described herein includes a method for source peer capacity-based Diameter load sharing. A network element for processing Diameter messages received from a Diameter peer requests information regarding a Diameter message capacity requirement of the Diameter peer, receives information regarding the Diameter message capacity requirement of the Diameter peer, and uses the received information to load share the processing. In one embodiment, the network element is a Diameter signaling router having multiple message processors for processing Diameter messages, and the information regarding the Diameter message capacity requirement of the Diameter peer is used to load share Diameter message processing and/or Diameter connections among the multiple message processors.

39 Claims, 8 Drawing Sheets

(56) References Cited

U.S. PATENT DOCUMENTS

| | | | |
|---|---|---|---|
| 6,865,153 B1 | 3/2005 | Hill et al. | |
| 6,915,345 B1 | 7/2005 | Tummala et al. | |
| 6,918,041 B1 | 7/2005 | Chen | |
| 6,954,790 B2 | 10/2005 | Forslöw | |
| 6,967,956 B1 | 11/2005 | Tinsley et al. | |
| 7,042,877 B2 | 5/2006 | Foster et al. | |
| 7,043,000 B2 | 5/2006 | Delaney et al. | |
| 7,079,499 B1* | 7/2006 | Akhtar et al. | 370/310 |
| 7,136,635 B1 | 11/2006 | Bharatia et al. | |
| 7,257,636 B2 | 8/2007 | Lee et al. | |
| 7,286,516 B2 | 10/2007 | Delaney et al. | |
| 7,292,592 B2 | 11/2007 | Rune | |
| 7,298,725 B2* | 11/2007 | Rune | 370/338 |
| 7,333,438 B1 | 2/2008 | Rabie et al. | |
| 7,333,482 B2 | 2/2008 | Johansson et al. | |
| 7,383,298 B2 | 6/2008 | Palmer et al. | |
| 7,403,492 B2 | 7/2008 | Zeng et al. | |
| 7,403,537 B2 | 7/2008 | Allison et al. | |
| 7,466,807 B2 | 12/2008 | McCann et al. | |
| 7,551,926 B2 | 6/2009 | Rune | |
| 7,567,796 B2 | 7/2009 | Tammi et al. | |
| 7,583,963 B2 | 9/2009 | Tammi et al. | |
| 7,590,732 B2* | 9/2009 | Rune | 709/225 |
| 7,633,872 B2 | 12/2009 | Pitcher et al. | |
| 7,633,969 B2 | 12/2009 | Caugherty et al. | |
| 7,706,343 B2 | 4/2010 | Delaney et al. | |
| 7,792,981 B2 | 9/2010 | Taylor | |
| 7,822,023 B2 | 10/2010 | Lahetkangas et al. | |
| 7,892,991 B2* | 2/2011 | Yamanaka et al. | 442/328 |
| 7,894,353 B2 | 2/2011 | Li et al. | |
| 7,898,957 B2 | 3/2011 | Lea et al. | |
| 7,916,685 B2 | 3/2011 | Schaedler et al. | |
| 7,961,685 B2 | 6/2011 | Suh et al. | |
| 7,996,007 B2 | 8/2011 | Bantukul | |
| 7,996,541 B2 | 8/2011 | Marathe et al. | |
| 8,041,021 B2 | 10/2011 | Xu et al. | |
| 8,045,983 B2 | 10/2011 | Bantukul | |
| 8,170,035 B2 | 5/2012 | Furey et al. | |
| 8,170,055 B2 | 5/2012 | Fang et al. | |
| 2001/0024443 A1 | 9/2001 | Alriksson et al. | |
| 2002/0049901 A1 | 4/2002 | Carvey | |
| 2002/0051427 A1 | 5/2002 | Carvey | |
| 2002/0087723 A1 | 7/2002 | Williams et al. | |
| 2002/0133494 A1 | 9/2002 | Goedken | |
| 2002/0133534 A1 | 9/2002 | Forslow | |
| 2002/0141346 A1 | 10/2002 | Garcia-Luna-Aceves et al. | |
| 2002/0181507 A1 | 12/2002 | Jones | |
| 2003/0095536 A1 | 5/2003 | Hu et al. | |
| 2003/0115358 A1 | 6/2003 | Yun | |
| 2004/0037278 A1 | 2/2004 | Wong et al. | |
| 2004/0042485 A1 | 3/2004 | Gettala et al. | |
| 2004/0098612 A1 | 5/2004 | Lee et al. | |
| 2005/0002417 A1 | 1/2005 | Kelly et al. | |
| 2005/0099964 A1 | 5/2005 | Delaney et al. | |
| 2005/0232236 A1 | 10/2005 | Allison et al. | |
| 2005/0232407 A1 | 10/2005 | Craig et al. | |
| 2005/0235065 A1 | 10/2005 | Le et al. | |
| 2005/0246545 A1 | 11/2005 | Reiner | |
| 2005/0246716 A1 | 11/2005 | Smith et al. | |
| 2006/0045249 A1 | 3/2006 | Li et al. | |
| 2006/0077926 A1 | 4/2006 | Rune | |
| 2006/0101159 A1 | 5/2006 | Yeh et al. | |
| 2006/0104210 A1 | 5/2006 | Nielsen | |
| 2006/0123477 A1 | 6/2006 | Raghavan et al. | |
| 2006/0172730 A1 | 8/2006 | Matsuda | |
| 2006/0177007 A1 | 8/2006 | Vaghar et al. | |
| 2006/0200670 A1 | 9/2006 | Kuffel et al. | |
| 2006/0221972 A1 | 10/2006 | Bhargava et al. | |
| 2006/0253563 A1 | 11/2006 | Yang et al. | |
| 2006/0274744 A1 | 12/2006 | Nagai et al. | |
| 2007/0047539 A1 | 3/2007 | Agarwal et al. | |
| 2007/0153995 A1 | 7/2007 | Fang et al. | |
| 2007/0168421 A1 | 7/2007 | Kalyanpur et al. | |
| 2007/0214209 A1 | 9/2007 | Maeda | |
| 2007/0280447 A1 | 12/2007 | Cai et al. | |
| 2007/0297419 A1 | 12/2007 | Asherup et al. | |
| 2008/0025230 A1 | 1/2008 | Patel et al. | |
| 2008/0039104 A1 | 2/2008 | Gu et al. | |
| 2008/0043614 A1* | 2/2008 | Soliman | 370/208 |
| 2008/0144602 A1 | 6/2008 | Casey | |
| 2008/0146763 A1* | 6/2008 | Yamanaka et al. | 526/352.2 |
| 2008/0167035 A1 | 7/2008 | Buckley et al. | |
| 2008/0301162 A1 | 12/2008 | Wall et al. | |
| 2008/0317247 A1 | 12/2008 | Jeong et al. | |
| 2009/0080440 A1 | 3/2009 | Balyan et al. | |
| 2009/0083861 A1 | 3/2009 | Jones | |
| 2009/0129271 A1 | 5/2009 | Ramankutty et al. | |
| 2009/0138619 A1 | 5/2009 | Schnizlein et al. | |
| 2009/0185494 A1 | 7/2009 | Li et al. | |
| 2009/0193071 A1 | 7/2009 | Qiu et al. | |
| 2009/0232011 A1 | 9/2009 | Li et al. | |
| 2010/0042525 A1 | 2/2010 | Cai et al. | |
| 2010/0135287 A1 | 6/2010 | Hosain et al. | |
| 2010/0265948 A1 | 10/2010 | Patel et al. | |
| 2010/0299451 A1 | 11/2010 | Yigang et al. | |
| 2011/0060830 A1 | 3/2011 | Kang et al. | |
| 2011/0116378 A1 | 5/2011 | Ramankutty et al. | |
| 2011/0116382 A1 | 5/2011 | McCann et al. | |
| 2011/0188397 A1 | 8/2011 | McCann et al. | |
| 2011/0199895 A1 | 8/2011 | Kanode et al. | |
| 2011/0199906 A1 | 8/2011 | Kanode et al. | |
| 2011/0200047 A1 | 8/2011 | McCann et al. | |
| 2011/0200053 A1 | 8/2011 | Kanode et al. | |
| 2011/0200054 A1 | 8/2011 | Craig et al. | |
| 2011/0202612 A1 | 8/2011 | Craig et al. | |
| 2011/0202613 A1 | 8/2011 | Craig et al. | |
| 2011/0202614 A1 | 8/2011 | Craig et al. | |
| 2011/0202676 A1* | 8/2011 | Craig et al. | 709/238 |
| 2011/0202677 A1 | 8/2011 | Craig et al. | |
| 2011/0202684 A1 | 8/2011 | Craig et al. | |
| 2011/0225280 A1 | 9/2011 | Delsesto et al. | |
| 2011/0225306 A1 | 9/2011 | Delsesto et al. | |
| 2011/0302244 A1 | 12/2011 | McCann et al. | |
| 2011/0314178 A1 | 12/2011 | Kanode et al. | |
| 2012/0155389 A1 | 6/2012 | McNamee et al. | |
| 2012/0224524 A1 | 9/2012 | Marsico | |

FOREIGN PATENT DOCUMENTS

| | | |
|---|---|---|
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| WO | WO 2009/058067 A1 | 5/2009 |
| WO | WO 2009/070179 A1 | 6/2009 |
| WO | WO 2009/134265 A1 | 11/2009 |
| WO | WO 2011/047382 A2 | 4/2011 |
| WO | WO 2011/10609 A2 | 8/2011 |
| WO | WO 2011/100587 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100626 A2 | 8/2011 |
| WO | WO 2011/100629 A2 | 8/2011 |
| WO | WO 2011/100630 A2 | 8/2011 |
| WO | WO 2008/087633 A2 | 2/2012 |
| WO | WO 2012/119147 A1 | 9/2012 |

OTHER PUBLICATIONS

Applicant-Initiated Interview Summary for U.S. Appl. No. 12/906,816 (Jan. 27, 2012).

Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).

(56) References Cited

OTHER PUBLICATIONS

Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/0124645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Notification of Transmittal of the International Search Report and the Written Opinion of the International Searching Authority, of the Declaraction for International Application No. PCT/US2010/053062 (Jun. 28, 2011).
Znaty, "Diameter, GPRS, (LTE+ePC=EPS), IMS, PCC and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signaling flows adn Quality of Service (QoS) parameter mapping (Release 9)," 3GPP TS 29.213, V9.2.1, pp. 1-129 (Mar. 2010).

"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications Systems (UMTS); LTE; IP Multimedia (IM) Subsystem Cx and Dx Interfaces; Signaling Flows and Message Contents (3GPP TS 29.228 Version 8.7.0 Release 8)," ETSI TS 129 228 v8.7.0 (Jan. 2010).
"Mapping Diameter Interfaces to Functinality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Service and System Aspects; Telecommunications Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunications Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).

(56) References Cited

OTHER PUBLICATIONS

3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Krohonen et al., "Diameter User-Name and Realm Based Request Routing Clarifications," Diameter Maintenance and Extensions (DIME) Internet-Draft, draft-ieft-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Specific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evovled Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Released 8)," 3GPP TR 29.909 V8.1.2 (Jan. 2009).
3GPP, "3rd Generation Partnership Project; Technical Specification Group Service and System Aspects; Telecommunications Management; Charging Management; Charging Data Description for the IP Multimedia Subsystem (IMS) (Release 5), " 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Hakala et al., "Diameter Credit-Control Application," Network Working Group RFC 4006, pp. 1-107 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).

"Diameter Overview," referenced from www.ulticom.com/html/products/signalware-diameter-reference-guide.asp (Publication Date Unknown).
Final Official Action for U.S. Appl. No. 13/026,105 (Nov. 26, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Traffix Systems, "Datasheet; Traffix Signaling Delivery Controller (SDC)," pp. 1-5 (May 2011).
Notice of Allowance and Fee(s) Due for U.S. Appl. No. 13/026,162 (Dec. 19, 2012).
Final Official Action for U.S. Appl. No. 13/026,076 (Dec. 7, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Supplemental Notice of Allowability for U.S. Appl. No. 13/026,162 (Feb. 7, 2013).
Supplemental Notice of Allowability for U.S. Appl. No. 13/026,162 (Jan. 24, 2013).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005)
Calhoun et al., "Diameter Mobile IPv4 Application," Network Working Group, RFC 4004, pp. 1-50 (Aug. 2005).

(56) References Cited

OTHER PUBLICATIONS

3GPP, "3rd Generation Partnership Project; Technical Specification Group Core Network; Support of Mobile.Number Portability (MNP); Technical Realization; Stage 2 (Release 6)," 3GPP TS 23.066, V6.0.0, pp. 1-83 (Dec. 2004).

Calhoun et al., "Diameter Base Protcol," Network Working Group, RFC 3588, pp. 1-148 (Sep. 2003).

Aboba et al., "Authentication, Authorization and Accounting (AAA) Transport Profile," Network Working Group, RFC 3539, pp. 1-39 (Jun. 2003).

Stewart et al., "Stream Control Transmission Protocol," Network Working Group RFC 2960, pp. 1-134 (Oct. 2000).

Greene et al., "Bi-Directional Session Setup Extension to Diameter," Internet Draft <draft-greene-diameter-ss7-session-00.txt>, pbs. 1-12 (Jul. 1998).

Notice of Allowance and Fee(s) Due for U.S. Appl. No. 13/026,112 (Apr. 26, 2013).

Notice of Allowance and Fee(s) Due for U.S. Appl. No. 13/026,153 (Apr. 15, 2013).

Notice of Allowance and Fee(s) Due for U.S. Appl. No. 13/026,162 (Apr. 1, 2013).

"Diameter Overview," referenced from www.ulticom.com/html/products/signalware-diameter-reference-guide.asp, pp. 1-3 (Publication Date Unknown) (Printed from the Internet Aug. 3, 2007).

* cited by examiner

US 8,601,073 B2

METHODS, SYSTEMS, AND COMPUTER READABLE MEDIA FOR SOURCE PEER CAPACITY-BASED DIAMETER LOAD SHARING

PRIORITY CLAIM

This application claims the benefit of U.S. Provisional Patent Application Ser. No. 61/304,310, filed Feb. 12, 2010; the disclosure of which is incorporated herein by reference in its entirety.

STATEMENT OF INCORPORATION BY REFERENCE

The disclosures of each of the following commonly-owned, co-pending U.S. patent Applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application
Loop Prevention," (Ser. No. 13/026,162).

TECHNICAL FIELD

The subject matter described herein relates to methods and systems for distribution of Diameter signaling messages and Diameter signaling message processing. More particularly, the subject matter described herein relates to methods, systems, and computer readable media for source peer capacity-based Diameter load sharing.

BACKGROUND

Diameter is an authentication, authorization and accounting (AAA) protocol for computer networks, and is a successor to Radius. It is used as a secure protocol for delivering AAA capability over a base network. The Diameter base protocol is defined in International Engineering Task Force (IETF) request for comments (RFC) 3588 which is incorporated by reference herein in its entirety. Extensions to the base protocol also exist, with some extensions having defined standards. For example, RFC 4072 defines Diameter Extensible Authentication Protocol (EAP) Application. The above-referenced Diameter standards do not address Diameter node implementations. The standards also do not address how to efficiently distribute Diameter messages to processing elements in a given Diameter node architecture.

Accordingly, there exists a need for methods, systems, and computer readable media for source peer capacity-based Diameter load sharing.

SUMMARY

According to one aspect, the subject matter described herein includes a method for source peer capacity-based Diameter load sharing. A network element for processing Diameter messages received from a Diameter peer requests information regarding a Diameter message capacity requirement of the Diameter peer, receives information regarding the Diameter message capacity requirement of the Diameter peer, and uses the received information to load share the processing. In one embodiment, the network element is a Diameter signaling router having multiple message processors for processing Diameter messages, and the information regarding the Diameter message capacity requirement of the Diameter peer is used to load share Diameter message processing and/or Diameter connections among the multiple message processors.

According to another aspect, the subject matter described herein includes a system for source peer capacity-based load sharing of Diameter message processing. The system includes a network element for processing Diameter messages received from a Diameter peer. The network element includes at least one message processor for processing the Diameter signaling messages. The network element is configured to request information regarding a Diameter message capacity requirement of the Diameter peer, receive information regarding the Diameter message capacity requirement of the Diameter peer, and use the received information to load share the processing. In one embodiment, the network element is a Diameter signaling router having multiple message processors for processing Diameter messages, and the information regarding the Diameter message capacity requirement of the Diameter peer is used to load share Diameter message processing and/or Diameter connections among the multiple message processors.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for source peer capacity-based Diameter load sharing based on information regarding the Diameter message capacity of a peer node. As described below, Diameter connections between Diameter peer nodes are established in a manner that considers the Diameter message capacity requirements of the source peer node, including, but not limited to, the rate at which the peer can send or receive Diameter messages, the rate at which the peer can send or receive Diameter request or answer messages, and the peer's Diameter transaction rate capacity, as well as application-specific message source/receipt/transaction capacity. The concept of a logical Diameter signaling router that includes multiple Diameter message processors is also disclosed. In one embodiment, the message processors appear to Diameter peer nodes external to the DSR as a discrete Diameter relay node. Thus, the DSR disclosed herein is sometimes referred to as a virtual Diameter relay or routing node.

Reference will now be made in detail to exemplary embodiments of the present invention, examples of which are illustrated in the accompanying drawings. Wherever possible, the same reference numbers will be used throughout the drawings to refer to the same or like parts.

Figure 1:
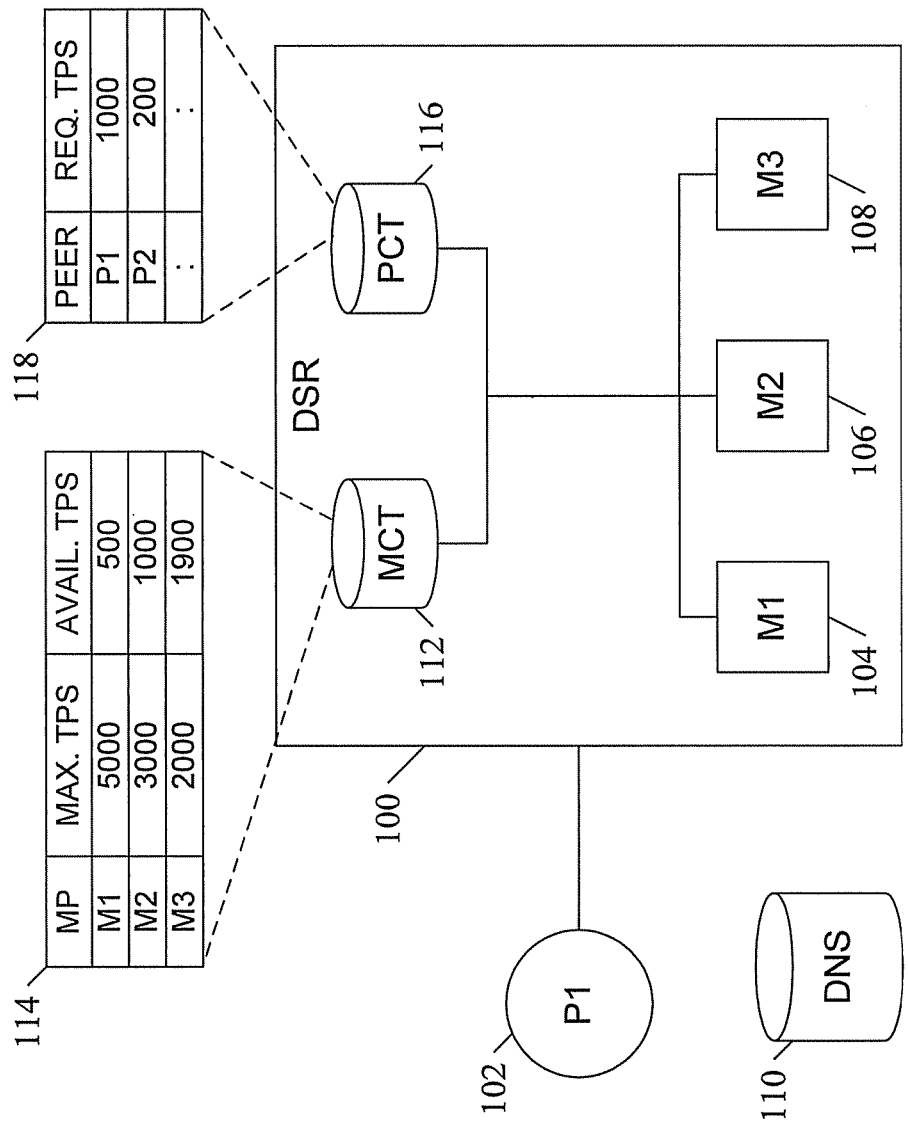
FIG. 1 is a block diagram illustrating an exemplary system for source peer capacity-based Diameter load sharing according to an embodiment of the subject matter described herein.

FIG. 1 is a block diagram illustrating an exemplary system for source peer capacity-based Diameter load sharing according to an embodiment of the subject matter described herein. The system includes a network element 100 for processing Diameter messages received from a Diameter peer P1 102. Network element 100 is configured to request information regarding a Diameter message capacity requirement of Diameter peer P1 102, receive information regarding the Diameter message capacity requirement of Diameter peer P1 102, and use the received information to load share the processing. In one embodiment, network element 100 may include multiple message processors for processing Diameter messages, and the information regarding the Diameter message capacity requirement of the Diameter peer is used to load share Diameter message processing and/or Diameter connections among the multiple message processors. If network element 100 is a Diameter signaling router, processing Diameter signaling messages can include routing Diameter signaling messages. In an alternate embodiment, network element 100 may include a single message processor that processes Diameter signaling messages.

Diameter nodes may be nodes capable of implementing or using a Diameter protocol. For example, network element 100 may comprise a Diameter signaling router (DSR), a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a charging data function (CDF), an online charging system, an offline charging system, a policy charging enforcement function (PCEF), a policy charging and rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, a Diameter message processor, a data collection platform, a multi-protocol signaling gateway, a multi-protocol signaling router, or a computing platform. Examples of a DSR include, but are not limited to, a Diameter routing agent, a Diameter relay agent, a Diameter redirect agent, a Diameter translation agent, a Diameter proxy agent.

In the embodiment illustrated in FIG. 1, for example, the network element is a Diameter signaling router (DSR) 100 that includes three message processors, M1 104, M2 106, and M3 108. Some or all of the message processors within DSR 100 may communicate Diameter protocol messages with one or more Diameter peer nodes. For example, in the embodiment illustrated in FIG. 1, message processors M1 104, M2 106, and/or M3 108 may communicate with Diameter peer P1 102. Examples of message processors include but are not limited to a computing blade in a blade-based distributed computing platform, a computer processing core element associated with a single- or multi-core computing device, etc. In some embodiments, multiple DSRs may be instantiated on a single physical message processing / computing module.

In one embodiment, DSR 100 may have a single fully qualified domain name (FQDN), which Diameter peer P1 uses to address Diameter messages that P1 102 wants to send to DSR 100. For example, DSR 100 may be identified by the FQDN "DSR1". In one embodiment, P1 102 may send a domain name system (DNS) query that includes "DSR1" to a DNS server 110. DNS server 110 may respond with one or more addresses that correspond to the message processors within DSR 100. P1 102 may then send a Diameter message to DSR 100 using one of the address or addresses returned by DNS server 110. Other mechanisms or procedures to determine the address of DSR 100 may be used by P1 102.

In one embodiment, DSR 100 may maintain information about the Diameter message capacity of each of its message processors. In the embodiment illustrated in FIG. 1, DSR 100 contains a message processor capacity table (MCT) 112 for maintaining information about the Diameter message capacity for each of message processors M1 104, M2 106, and M3 108. This information may be stored in a table, database, or other suitable means. In the embodiment illustrated in FIG. 1, MCT 112 may use a table 114 to store multiple records, where each record includes a field for the message processor name ("MP"), a field for maximum message capacity for the message processor ("MAX. TPS"), and a field for currently available message capacity for the message processor ("AVAIL TPS"). For example, table 114 indicates that message processor M1 104 can process up to 5,000 transactions per second (TPS) and that of that capacity, only 500 TPS is available, i.e., it is currently processing 4,500 TPS. Message processor M2 106 can process up to 3,000 TPS and is currently processing 2,000 TPS, leaving 1,000 TPS available. Message processor M3 108 can process up to 2,000 TPS and is currently processing only 100 TPS, leaving 1,900 TPS available.

In one embodiment DSR 100 may maintain information about the Diameter message capacity requirements for each peer node with which DSR 100 may communicate. In the embodiment illustrated in FIG. 1, DSR 100 contains a peer capacity table (PCT) 116 for maintaining information about the Diameter message capacity requirements for peer node P1 102, for peer node P2 (not shown), as well as other peers nodes that may communicate with DSR 100. This information may be stored in a table, database, or other suitable means. In the embodiment illustrated in FIG. 1, PCT 116 may use a table 118 to store multiple records, where each record includes a field for the peer name ("PEER"), and a field for the required or requested message capacity ("REQ. TPS".) For example, table 118 indicates that peer P1 102 requires 1000 TPS and that peer P2 requires 200 TPS.

Figure 2:
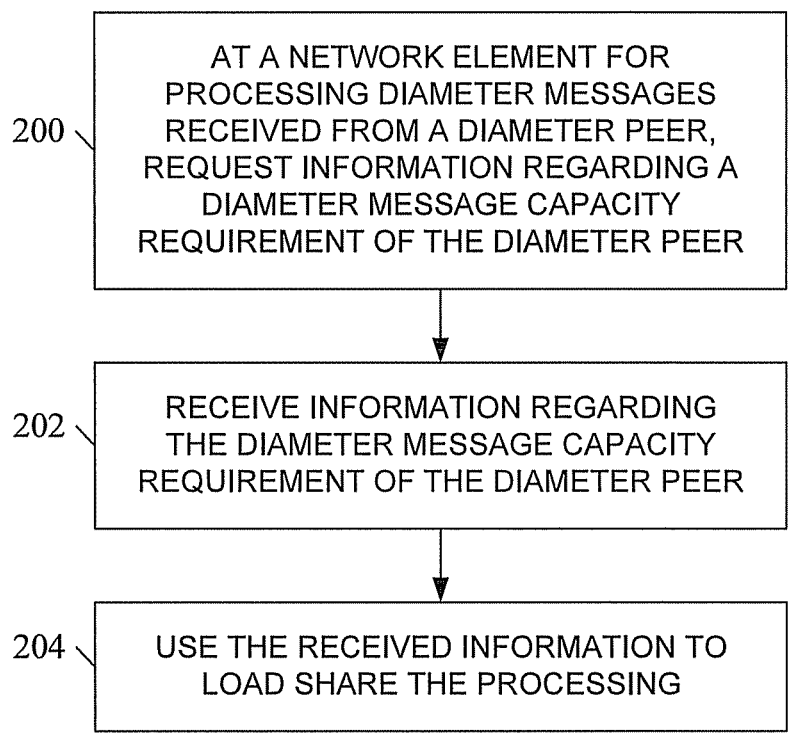
FIG. 2 is a flow chart illustrating an exemplary process for source peer capacity-based Diameter load sharing according to an embodiment of the subject matter described herein.

FIG. 2 is a flow chart illustrating an exemplary process for source peer capacity-based Diameter load sharing according to an embodiment of the subject matter described herein.

At block 200, a network element for processing Diameter messages received from a Diameter peer requests information regarding a Diameter message capacity requirement of the Diameter peer. For example, referring to FIG. 1, DSR 100 may request the Diameter message capacity requirements or capabilities of Diameter peer P1 102. In one embodiment, DSR 100 may issue this request in response to receiving from P1 102 a request for a Diameter connection.

At block 202, information regarding the Diameter message capacity requirement of the Diameter peer is received. For example, P1 102 may send to DSR 100 information listing the Diameter message capacity requirements or capabilities of P1 102.

At block 204, the received information is used to load share the processing. Load sharing may include, but is not limited to, load sharing, load balancing, distributing, and assigning Diameter message processing based on the capacity requirements and capabilities of the source peer. In embodiments where the network element has multiple message processors, Diameter message processing may be load shared across or among all or a subset of the message processors. Load sharing of Diameter message processing may include load sharing of Diameter message traffic. Diameter message traffic may include, but is not limited to, Diameter connection requests, Diameter connections, or Diameter traffic associated with a Diameter connection. In FIG. 1, for example, Diameter message traffic from peer P1 102 may be load shared or balanced among message processors M1 104, M2 106, and M3 108, based on the Diameter message requirements/capacities of P1 102.

In one embodiment, the peer Diameter message capacity requirement information may be dynamically provisioned or determined. For example, DSR 100 may send to P1 102 a Diameter capabilities exchange request (CER) message for implicitly or explicitly requesting capacity capabilities information. P1 102 may respond with a Diameter capabilities exchange answer (CEA) message, where the CEA message provides the requested capacity capabilities information. Once determined, this Diameter peer capacity/capabilities information may be stored in PCT 112 to obviate the need for additional CER/CEA exchanges during subsequent Diameter connection attempts from P1 102.

In an alternative embodiment, the peer Diameter message capacity requirement information may be statically provisioned. For example, peer capacity table PCT 112 may be statically provisioned with information about the Diameter message capacity requirement of P1 102 and other peers. In this scenario, DSR 100 may request and receive information about a Diameter peer's Diameter message capacity simply by querying PCT 112. This may obviate the need for DSR 100 to perform a CER/CEA or any other query to the Diameter peers.

In embodiments here DSR 100 includes multiple message processors, at block 204, the received information may be used to load share among these message processors. For example, the source peer capacity information may be used to load share or load balance Diameter message traffic received from the Diameter peer. In one embodiment, information about the Diameter message processing capacity of each of the message processors may also be considered. Using the example illustrated in FIG. 1, P1 102 may make a Diameter connection request. From table 118, it can be seen that P1 102 needs 1000 TPS for the Diameter connection. Table 114 within MCT 112 indicates that M1 104 has the highest maximum capacity (5,000 TPS), but is heavily loaded and has only 500 TPS available. For this reason, M1 104 cannot satisfy the Diameter message capacity requirement of P1 102. Message processors M2 106 and M3 108 both have adequate capacity available—1,000 TPS and 1,900 TPS, respectively—but M3 108 is least loaded of the message processors. Thus, in one embodiment, M3 108 may be the better choice. Alternatively, a selection algorithm may choose the message processor with the highest maximum capacity that can satisfy the Diameter message capacity requirement of P1 102, in which case M2 106 may be the better choice. The selection algorithm is not limited to the examples described above. For example, in one embodiment, the selection algorithm may attempt to maximize capacity of one message processor before enlisting another message processor.

Figure 3:
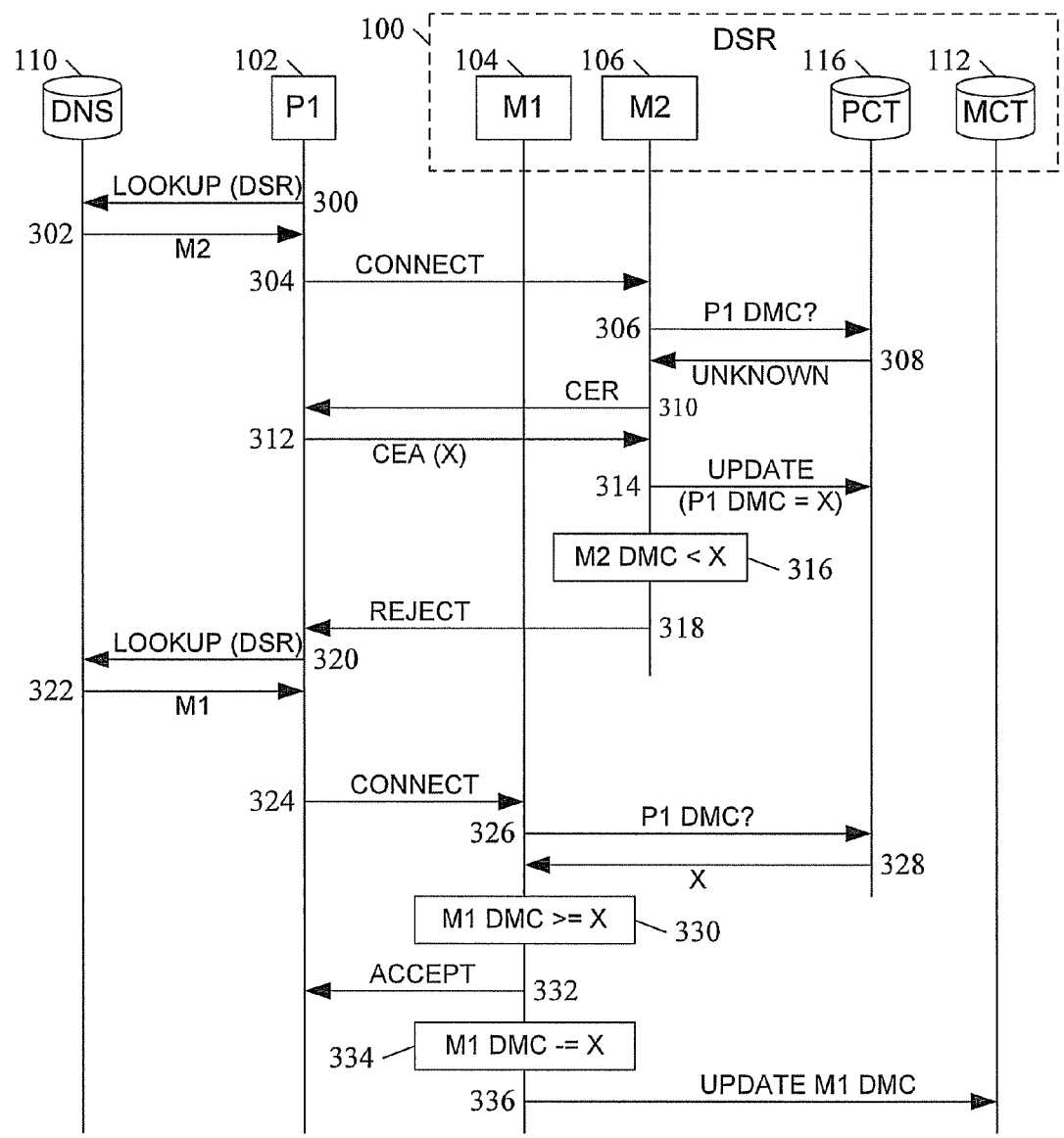
FIG. 3 is a message flow diagram illustrating exemplary signaling messages communicated during source peer capacity-based Diameter load sharing according to another embodiment of the subject matter described herein.

FIG. 3 is a message flow diagram (ladder diagram) illustrating exemplary signaling messages communicated during source peer capacity-based Diameter load sharing according to another embodiment of the subject matter described herein.

A DSR that includes multiple message processors for processing Diameter messages receives a Diameter connection request message from a Diameter peer. In the embodiment illustrated in FIG. 3, Diameter peer P1 102 may issue a DNS request message 300 that includes the fully qualified domain name of DSR 100 to DNS server 110, which responds with one or more addresses, e.g., by returning one or more A/AAAA records. In the embodiment illustrated in FIG. 3, DNS server 110 returns the address of message processor M2 106 in a DNS response message 302. Peer P1 102 then issues a Diameter connect request message 304 to M2 106.

The Diameter message capacity requirements of the Diameter peer is then determined. In order to determine the Diameter message capacity (DMC) required by P1 102, M2 106 sends a query message 306 to peer capacity table 116. In the scenario illustrated in FIG. 3, DSR 100 does not yet know the DMC requirements of P1 102, and PCT 116 indicates this to M2 106 via a response message 308. M2 106 then sends a Diameter capabilities exchanging request (CER) message 310 to P1 102, which requests capacity capabilities information from the Diameter peer node. In response, P1 102 replies with a capabilities exchanging answer (CEA) message 312, the CEA message indicating the Diameter message capacity requested or required by P1 102. In the embodiment illustrated in FIG. 3, P1 102 requires an amount of Diameter message capacity symbolized by the variable "X". M2 106 may then provide this information to PCT 116, such as by sending an update message 314 to PCT 116 indicating that P1 102 requires X amount of Diameter message capacity.

It is determined whether the Diameter message capacity requirement of the peer may be satisfied by one or more of the DSR message processors. In this embodiment illustrated in FIG. 3, M2 106 determines whether or not its capacity, shown in FIG. 3 as "M2 DMC", is sufficient to meet the needs of P1 102. In this example, at block 316 M2 106 determines that it does not have sufficient Diameter message capacity and therefore sends a message 318 indicating to P1 102 that the Diameter connection request was rejected. In the embodiment illustrated in FIG. 3, P1 102 responds to the rejection by again querying DNS server 110 (message 320) but this time getting another address that is also associated with DSR 100, i.e., the address of message processor M1 104 (message 322.) P1 102 issues a Diameter connection request message 324 to M1 104. Like M2 106, M1 104 also queries PCT 116 (message 326), but this time, PCT 116 knows the DMC requirements of P1 102 and therefore sends to M1 104 a reply message 328 that includes the DMC value X. At block 320, M1 104 determines that its Diameter message capacity, shown in FIG. 3 as "M1 DMC", is sufficient to meet the requirements of P1 102. Thus, M1 104 sends to P1 102 a message 322 indicating that the Diameter connection request is accepted. In this manner, upon a determination that the Diameter message capacity requirement of the Diameter peer may be satisfied by one or more of the DSR message processors, one of the message processors is selected and the Diameter connection request message is directed to the selected DSR message processor.

In order to maintain up-to-date message processor capacity information, the message processor that has accepted the Diameter connection request message may update information about its current Diameter message processing load. In the embodiment illustrated in FIG. 3, M1 104 reserves the entire amount of Diameter message capability X for use by P1 102. Therefore, M1 104 subtracts X from its current DMC (block 334) to determine its new current Diameter message processing capability, and sends that information to MCT 112 in an update message 336.

Figure 4:
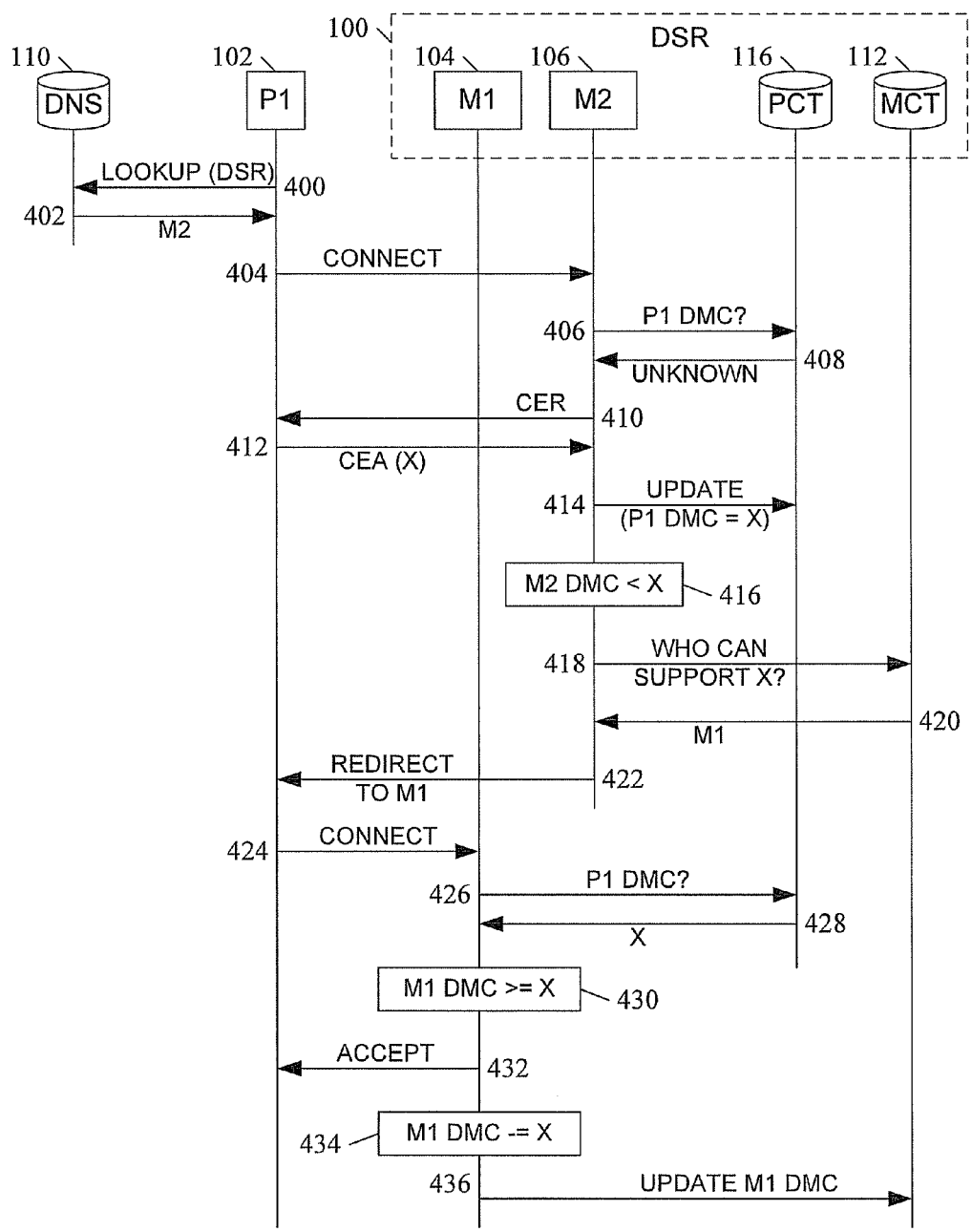
FIG. 4 is a message flow diagram illustrating exemplary signaling messages communicated during source peer capacity-based Diameter load sharing according to another embodiment of the subject matter described herein.

FIG. 4 is a message flow diagram illustrating exemplary signaling messages communicated during source peer capacity-based Diameter load sharing according to another embodiment of the subject matter described herein. In FIG. 4, DSR 100 that includes multiple message processors for processing Diameter messages receives a Diameter connection request message from a Diameter peer. For example, Diameter peer P1 102 may issue a DNS request message 400 that includes the fully qualified domain name of DSR 100 to DNS server 110, which returns the address of message processor M2 106 in a DNS response message 402. Peer P1 102 then issues a Diameter connect request message 404 to M2 106. In order to determine the DMC required by P1 102, M2 106 sends a query message 406 to peer capacity table 116, which responds with message 408 indicating that P1's DMC is not yet known. M2 106 then sends a CER message 410 to P1 102, and P1 102 replies with a CEA message 412, indicating that P1 102 requires "X" amount of message capacity. M2 106 then updates PCT 116 (message 414.)

In the embodiment illustrated in FIG. 4, M2 106 determines that it does not have sufficient Diameter message capacity. Rather than rejecting the Diameter connection request and forcing the peer to perform another DNS query, M2 106 sends a query message 418 to the message processor capacity table 112, asking if there is any message processor that can provide the necessary Diameter message capacity required by P1 102. In this example, MCT 112 determines that M1 104 has the required capacity. In one embodiment, MCT 112 sends to M2 106 a message 420 indicating that M1 104 has sufficient capacity, and M2 106 sends to P1 102 a redirect message 422, which instructs P1 102 to redirect its Diameter connection attempt to M1 104. In an alternative embodiment, MCT 112 may issue the redirect message 422 directly to P1 102, obviating the need for further involvement by M2 106. P1 102 issues another Diameter connection request message 424, this time to M1 104. M1 104 queries PCT 116 to determine the DMC requirements of P1 102. PCT 116 now has this information, and provides it to M1 104 via message 428. At block 430, M1 104 determines that it has sufficient Diameter message capacity and therefore accepts the Diameter connection request (message 432.) M1 104 recalculates its current/available message capacity (block 434) and informs MCT 112 of the change (message 436.)

Figure 5:
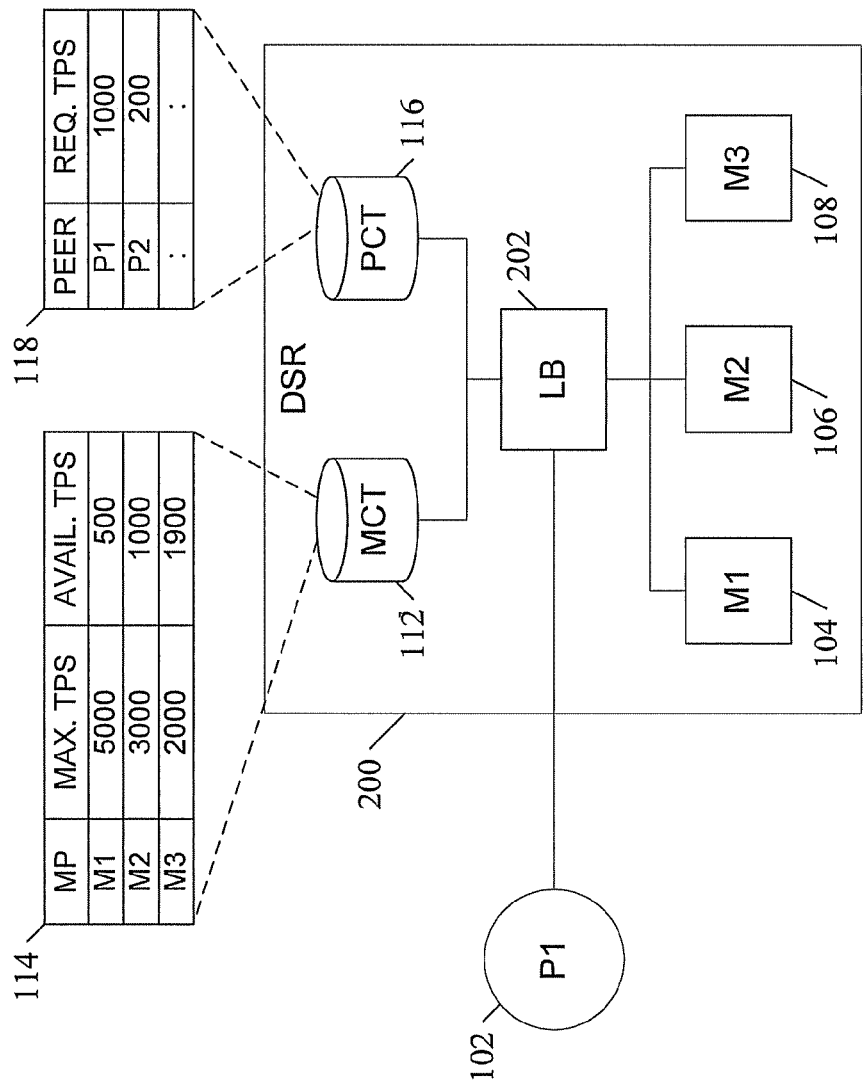
FIG. 5 is a block diagram illustrating an exemplary system for source peer capacity-based Diameter load sharing according to an embodiment of the subject matter described herein.

FIG. 5 is a block diagram illustrating an exemplary system for source peer capacity-based Diameter load sharing according to an embodiment of the subject matter described herein. Diameter signaling router (DSR) 200 is similar to DSR 100 illustrated in FIG. 1 and includes multiple processing message processors for processing Diameter messages, a message processor capacity table and a peer capacity table. The elements M1 104, M2 106, M3 108, Diameter peer P1 102, MCT 112, table 114, PCT 116, and table 118 are identical to their like-numbered counterparts in FIG. 1, and therefore their descriptions will not be repeated here. However, unlike DSR 100 illustrated in FIG. 1, DSR 200 includes a centralized load balancing module (LB) 202, which receives Diameter connection requests from Diameter peers. The operation of DSR 200 will now be described with reference to FIG. 6.

Figure 6:
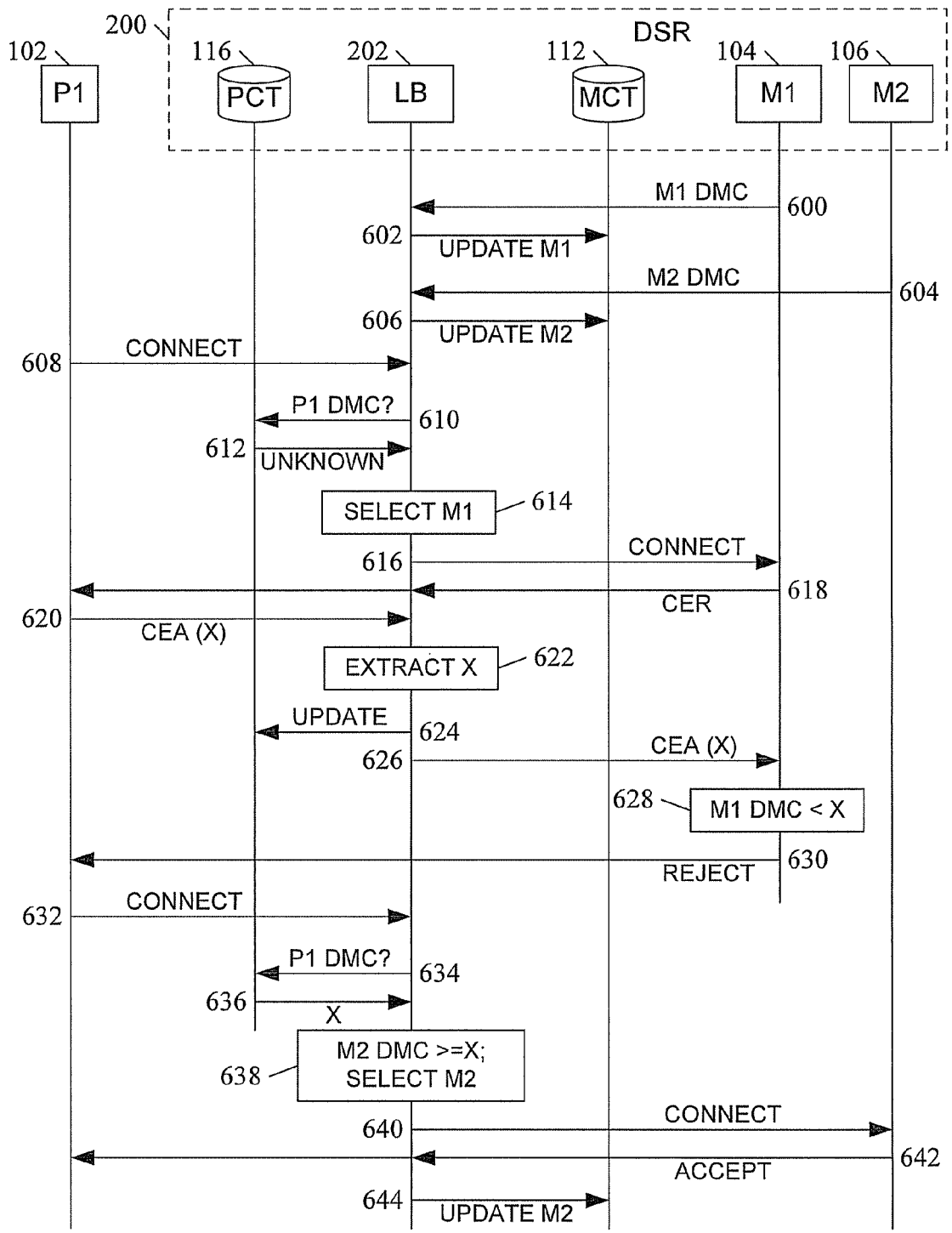
FIG. 6 is a message flow diagram illustrating exemplary signaling messages communicated during source peer capacity-based Diameter load sharing according to yet another embodiment of the subject matter described herein.

FIG. 6 is a message flow diagram illustrating exemplary signaling messages communicated during source peer capacity-based Diameter load sharing according to yet another embodiment of the subject matter described herein. In the example illustrated in FIGS. 5 and 6, it is assumed that LB 202 maintains information about the message processors within DSR 200 and stores this information in MCT 112.

In the embodiment illustrated in FIG. 6, message processor M1 104 sends to LB 202 a message 600 containing information about M1's Diameter message capacity (DMC), represented as "M1 DMC" in FIG. 6. For example, M1 104 may indicate its maximum DMC, what DMC is currently used and/or currently available for use, etc. In one embodiment, DMC values may be stated in standard terms, such as transactions per second (TPS) or other capacity or performance metric. In the embodiment illustrated in FIG. 6, LB 202 may update MCT 112 via an update message 602. The other message processors within DSR 200 may likewise send DMC messages to LB 202, which LB 202 then reports to MCT 112. In the embodiment illustrated in FIG. 6, for example, message processor M2 106 sends to LB 202 a message 604 indicating M2's DMC, represented as "M2 DMC" in FIG. 6, and LB 202 sends to MCT 112 a message 606 that contains DMC information for M2. In alternative embodiments, each message processor within DSR 200 may send DMC information directly to MCT 112, bypassing LB 202, or another component within DSR 200 other than LB 202 may perform these functions.

In one embodiment, all Diameter connection request messages are directed to LB 202 within DSR 200. For example, prior to sending a Diameter connection request message, peer P1 102 may query a DNS server (not shown) and be given the network address DSR 200, which internally routes Diameter connection request messages to LB 200. In embodiments where LB 202 has its own unique network address, a DNS query may return the network address of LB 202. In embodiments where DSR 200 contains multiple load balancing modules, a DNS query may return an address chosen from a list of load balancing modules, or return all of the addresses, from which the peer will select one address. In an alternative embodiment, peer P1 102 may be statically provisioned with the address of LB 202, rather than having to perform a DNS lookup or other address mapping/address determination step.

Regardless of the mechanism used to determine the address of LB 202, P1 102 issues a Diameter connection request message 608, which is received by LB 202. The Diameter message capacity requirement of the Diameter peer is then determined. In the embodiment illustrated in FIG. 6, LB 202 sends query message 610 to peer capacity table 116, asking for the DMC requirements of P1 102. In the scenario illustrated in FIG. 6, the DMC requirements of P1 102 are not yet known, which is indicated to LB 202 via reply message 612. Since the DMC requirements are not yet known, in one embodiment, LB 202 may simply select one of the message processors within DSR 200 at random, in round-robin fashion, or using some other selection process that may or may not consider current message capacity or availability of the message processors, and send or forward the connection request to the selected message processor. For example, LB 202 may engage in a query/response interaction (not shown) with MCT 112 to determine which message processor has the highest available message capacity and select that message processor. Other selection processes are contemplated.

In the embodiment illustrated in FIG. 6, LB 202 selects message processor M1 104 (block 614) and sends Diameter connection request message 616 to the selected message processor. M1 104 issues a CER message 618 to P1 102, and P1 102 responds with a CER message 620 that contains information about the DMC requested or required by P1 102, which is represented in FIG. 6 as the value X. In one embodiment, messages between message processors within DSR 200 and peers outside of DSR 200 pass through or are processed by LB 202, so that LB 202 detects the CEA message 620 sent by P1 102 and is able to extract the DMC requirements information (block 622.) In one embodiment, LB 202 may update information within PCT 116 via an update message 624 that indicates to PCT 116 that P1 102 requires X amount of Diameter message capacity. PCT 116 may then store this information for future use, such as in table 118. LB 202 may then send or forward a CEA message 626 to selected message processor M1 104.

Upon receiving the CEA message 626, M1 104 may evaluate whether it can meet the DMC required by P1 102. In the embodiment illustrated in FIG. 6, M1 104 determines that its capacity, "M1 DMC", is less than that required by P1 102, "X", and therefore sends to P1 102 a message 630 rejecting the Diameter connection request. In the embodiment illustrated in FIG. 6, message 630 is received by P1 102, and, in response, P1 102 may attempt a retry by sending a second Diameter connection request message 632 to LB 202. In an alternative embodiment, LB 202 may intercept reject message 630 and convert it to a redirect or reconnect message that includes the address of another message processor, such as M2 106.

Upon receiving the second Diameter connection request message 632, LB 202 again queries PCT 116 for information about P1's DMC requirements (message 634.) This time, this information is contained within PCT 116 and therefore response message 636 contains the value "X". Now knowing the Diameter message capacity requirement of the peer, LB 202 may use this information to select an appropriate message processor from the available message processors within DSR 200. For example, LB 202 may use information within MCT 112, such as maximum and available capacity of each message processor M1 104 and M2 106, to determine a list of candidate message processors that can meet the DMC requirements of P1 102 and select one or more message processors from the candidate list.

In the embodiment illustrated in FIG. 6, at block 638 LB 202 determines that message processor M2 106 has more than enough capacity to meet the DMC needs of P1 102, and therefore selects M2 106. LB 202 forwards a Diameter connection request message 640 to M2 106, which M2 106 accepts by sending an accept message 642 to P1 102. In the embodiment illustrated in FIG. 6, LB 202 intercepts or otherwise detects the acceptance by M2 106, determines that M2's available DMC capacity has been reduced by an amount X, and informs MCT 112 of this fact via an update message 644.

A Diameter peer may host multiple applications, each with its own particular DMC requirements. Thus, in one embodiment, a Diameter peer may respond to a request for information regarding its Diameter message capacity requirements by sending information that identifies the Diameter message capacity requirements for each of one or more applications hosted by the Diameter peer. This is illustrated in FIG. 7.

Figure 7:
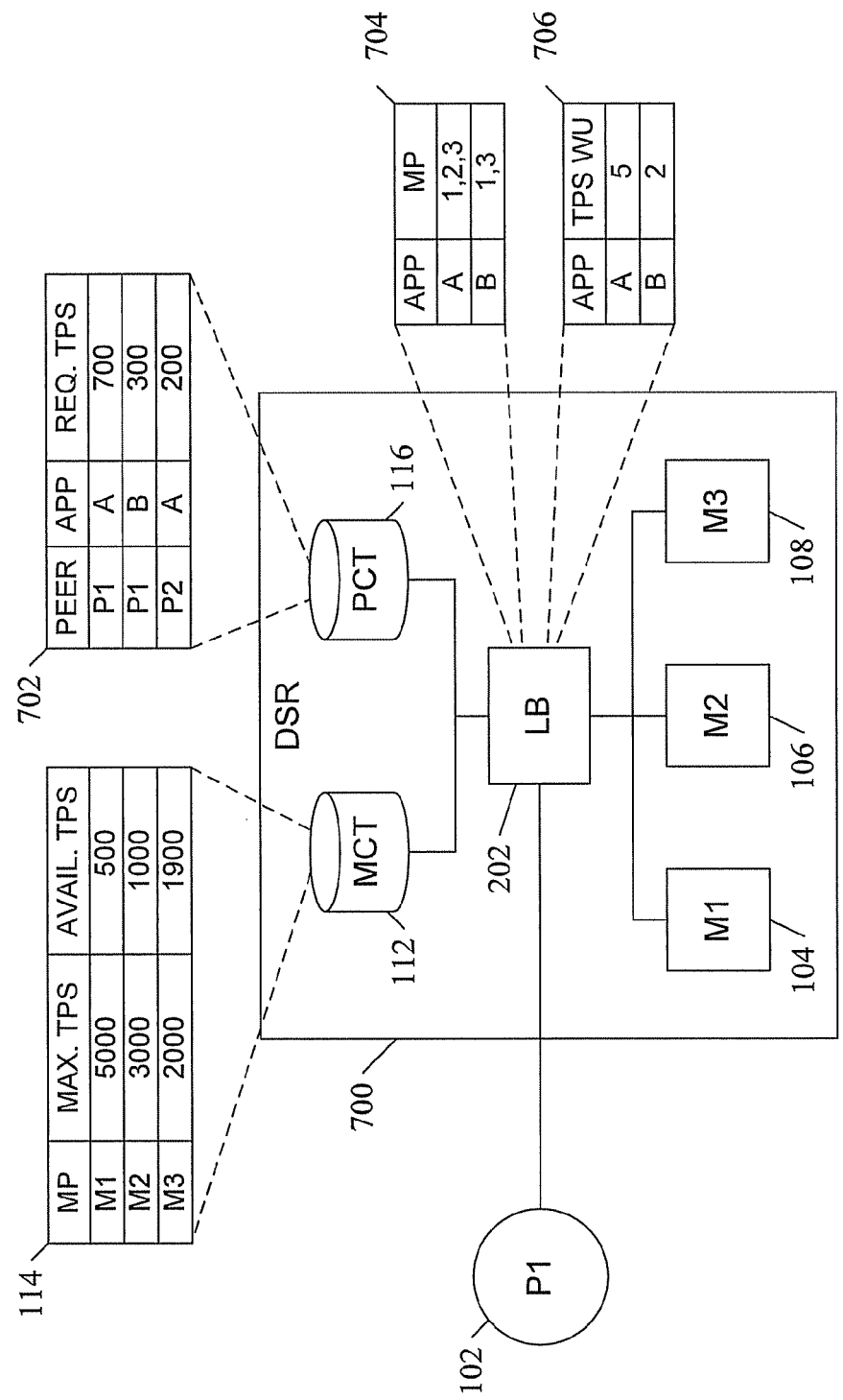
FIG. 7 is a block diagram illustrating an exemplary system for source peer capacity-based Diameter load sharing according to another embodiment of the subject matter described herein.

FIG. 7 is a block diagram illustrating an exemplary system for source peer capacity-based Diameter load sharing according to another embodiment of the subject matter described herein. Diameter signaling router (DSR) 700 is similar to DSR 200 illustrated in FIG. 2, and includes multiple processing message processors for processing Diameter messages, a message processor capacity table and a peer capacity table. The elements M1 104, M2 106, M3 108, Diameter peer P1 102, MCT 112, table 114, PCT 116, and LB 202 are identical to their like-numbered counterparts in FIG. 2, and therefore their descriptions will not be repeated here. Each message processor within DSR 700 supports one or more applications. In the embodiment illustrated in FIG. 7, two applications, A and B, are supported by DSR 700.

In the embodiment illustrated in FIG. 7, PCT 116 includes a more detailed table 702 that store Diameter message capability requirements broken out by both Diameter peer node and application. For example, each entry or record in table 702 includes a field identifying the peer ("PEER"), the application ("APP"), and the required TPS for that application ("REQ. TPS".) Rather than the aggregate TPS requirement (1,000 TPS) for P1 102 shown in table 118 in FIG. 1, table 702 indicates that 700 TPS is needed for application A and 300 TPS is needed for application B. Peer P2 (not shown) requires 200 TPS, all of which for application A and none for application B.

In the embodiment illustrated in FIG. 7, LB 202 maintains a table 704 that lists the message processors that can support each application. For example, table 704 indicates that message processors M1 104, M2 106, and M3 108 all support application A, but only M1 104 and M3 108 can support application B. Thus, LB 202 can take this information into account when selecting a message processor in response to a Diameter connection request from a Diameter peer. In one embodiment, a Diameter peer may establish connections to multiple message processors, one for each application.

In one embodiment, LB 202 is configured to translate peer message handling capability information into an arbitrary unit of work or processing resources related to message processors. For example, it may be determined that a Diameter peer is capable of handling 1,000 TPS associated with a Diameter application A, and capable of handling 500 TPS associated with Diameter application B. DSR 700 may determine that one transaction associated with application A requires 5 units of work/processing resources, and that one transaction associated with application B requires 2 units of work/processing resources. LB 202 then shares or distributes connections to available message processors based on the work/processing resources requirements that are calculated from the peer message handling capacity information provided for each connecting Diameter peer. In the embodiment illustrated in FIG. 7, for example, LB 202 maintains a table 706 for mapping an application to a TPS-to-MP work unit, and assigns a weight of 5 work units to application A and a weight of 2 work units to application B. This may be used, for example, to weight the selection process, e.g., by assigning a higher work unit factor to slower message processors or to more resource-intensive applications. The operation of DSR 700 will now be described with reference to FIG. 8.

Figure 8:
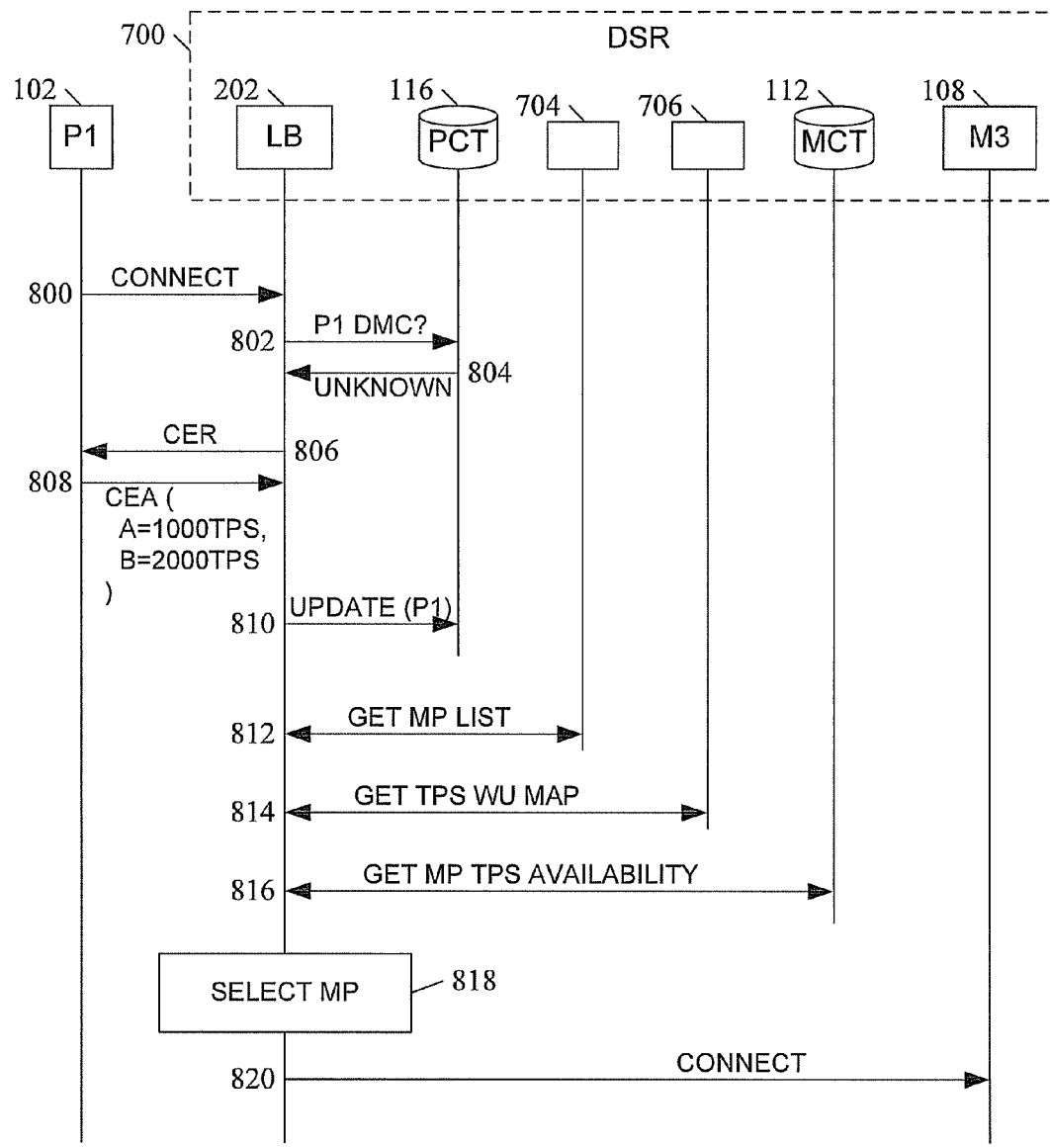
FIG. 8 is a message flow diagram illustrating exemplary signaling messages communicated during source peer capacity-based Diameter load sharing according to yet another embodiment of the subject matter described herein.

FIG. 8 is a message flow diagram illustrating exemplary signaling messages communicated during source peer capacity-based Diameter load sharing according to yet another embodiment of the subject matter described herein. Message 800 is a Diameter connection request from P1 102 to LB 202. LB 202 queries PCT 116 (message 802) and determines that no DMC information for P1 102 is known (message 804.) In the embodiment illustrate in FIG. 8, LB 202 issues a CER message 806 to P1 102, and receives a CEA message 808 from P1 102. In this example, the CEA message indicates that P1 102 requires 1,000 TPS for application A and 2,000 TPS for application B. LB 202 updates P1 102 information in PCT 116 using update message 810. LB 202 queries table 704 to get the list of MPs that support the applications identified in CEA message 808 (transaction 812.) LB 202 then reads the TPS-to-MP work unit conversion factors for table 706 (transaction 814.) LB 202 then reads the current available capacity information from MCT 112 (transaction 816.) In one embodiment, MCT 112 may return information for all message processors, which LB 202 may then cull using information from transaction 812. Alternatively, LB 202 may send to MCT 112 a list of candidate message processors received from transaction 812, and MCT 112 may send information for the listed message processors. At block 818, LB 202 uses the information received to select a suitable message processor. In the embodiment illustrated in FIG. 8, for example, may determine that message processor M3 108 is the best or only message processor that can provide the Diameter message capability required by P1 102 as indicated in CEA message 808.

The DSR is not limited to selecting only one of the multiple message processors available in response to a Diameter connection request. For example, where the Diameter peer supports multiple virtual Diameter relays, in one embodiment DSR 700 may instantiate connections from P1 102 to more than one message processor (e.g., one connection from M1 104 to virtual Diameter relay 1 on the peer, another connection from M2 106 to virtual Diameter relay 2 on the peer, etc.) such that no single connection to P1 102 exceeds the connection capacity constraint and the capacity across the sum of the connections meets or exceeds the source capacity required by P1 102.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for source peer capacity-based Diameter load sharing, the method comprising:
    at a network element for processing Diameter messages received from a Diameter peer: requesting information regarding a Diameter message capacity requirement of the Diameter peer;
    receiving information regarding the Diameter message capacity requirement of the Diameter peer;
    using the received information to load share the processing;
    wherein the network element includes a plurality of message processors for processing Diameter messages and wherein using the received information to load share the processing includes using the received information to load share the processing among the plurality of message processors; and
    wherein using the received information to load share the processing among the plurality of message processors includes using a message processor capacity table (MCT) for maintaining, for each message processor of the network element, a Diameter message capacity of the respective message processor.

2. The method of claim 1 wherein the network element comprises a Diameter signaling router.

3. The method of claim 1 wherein requesting information regarding a Diameter message capacity requirement of the Diameter peer includes requesting information in response to receiving a Diameter connection request message from the Diameter peer.

4. The method of claim 1 wherein the information regarding a Diameter message capacity requirement includes a Diameter transaction rate capacity.

5. The method of claim 4 wherein the Diameter transaction rate capacity includes a value indicating Diameter transactions per second (TPS).

6. The method of claim 1 wherein the Diameter message capacity requirement of the Diameter peer is statically provisioned.

7. The method of claim 1 wherein the Diameter message capacity requirement of the Diameter peer is dynamically provisioned.

8. The method of claim 7 wherein requesting information regarding a Diameter message capacity requirement includes using a Diameter capabilities exchange request (CER) message.

9. The method of claim 7 wherein receiving information regarding the Diameter message capacity requirement includes receiving a Diameter capabilities exchange answer (CEA) message.

10. The method of claim 1 wherein the Diameter message capacity requirement includes at least one of a Diameter message sourcing capacity and a Diameter message receipt capacity.

11. The method of claim 1 wherein using the received information to load share the processing includes using the received information to load share Diameter message traffic.

12. The method of claim 11 wherein using the received information to load share Diameter message traffic includes using the information to at least one of load share Diameter connection requests and load share Diameter connections.

13. The method of claim 1 wherein using the received information to load share the processing includes using information stored in a peer capacity table (PCT) for maintaining, for each Diameter peer in communication with the network element, a Diameter message capacity requirement of the respective Diameter peer.

14. The method of claim 1 wherein the Diameter message capacity requirement comprises a Diameter message handling capacity associated with an application and wherein using the received information to load share the processing includes using the received information to load share the processing among a plurality of instances of the application.

15. The method of claim 12 wherein using the received information to load share the processing among a plurality of instances of the application includes: using the received information to select an application from the plurality of applications; and directing Diameter message traffic to the selected application.

16. The method of claim 1 wherein using the received information to load share, among the plurality of message processors, Diameter message traffic received from the Diameter peer includes: using the received information to select a message processor from the plurality of message processors; and directing Diameter message traffic to the selected message processor.

17. The method of claim 1 wherein using the received information to load share the processing includes using the received information at least one of the plurality of message processors.

18. The method of claim 1 wherein using the received information to load share the processing includes using the received information at a load balancing module separate from the plurality of message processors.

19. The method of claim 1 wherein using the received information to load share the processing among the plurality of message processors includes selecting a message processor from the plurality of message processors based on a Diameter message capacity of at least one of the plurality of message processors.

20. A system for source peer capacity-based load sharing of Diameter message processing, the system comprising:
a network element for processing Diameter messages received from a Diameter peer, the network element including at least one message processor for processing the Diameter signaling messages, wherein the network element is configured to:
request information regarding a Diameter message capacity requirement of the Diameter peer;
receive information regarding the Diameter message capacity requirement of the Diameter peer;
use the received information to load share the processing;
wherein the network element includes a plurality of message processors for processing Diameter messages and wherein using the received information to load share the processing includes using the received information to load share the processing among the plurality of message processors; and
wherein using the received information to load share load share the processing among the plurality of message processors includes using a message processor capacity table (MCT) for maintaining, for each message processor of the network element, a Diameter message capacity of the respective message processor.

21. The system of claim 20 wherein the network element comprises a Diameter signaling router.

22. The system of claim 20 wherein the network element is configured to request the information regarding a Diameter message capacity requirement of the Diameter peer in response to receiving a Diameter connection request message from the Diameter peer.

23. The system of claim 20 wherein the information regarding a Diameter message capacity requirement of the Diameter peer includes a Diameter transaction rate capacity of the Diameter peer.

24. The system of claim 20 wherein the Diameter transaction rate capacity includes a value indicating Diameter transactions per second (TPS).

25. The system of claim 20 wherein the Diameter message capacity requirement of the Diameter peer is statically provisioned.

26. The system of claim 20 wherein the Diameter message capacity requirement of the Diameter peer is dynamically provisioned.

27. The system of claim 26 wherein requesting information regarding a Diameter message capacity requirement of the Diameter peer includes sending a Diameter capabilities exchange request (CER) message.

28. The system of claim 26 wherein receiving information regarding the Diameter message capacity requirement of the Diameter peer includes receiving a Diameter capabilities exchange answer (CEA) message.

29. The system of claim 20 wherein the Diameter message capacity requirement includes at least one of a Diameter message sourcing capacity and a Diameter message receipt capacity.

30. The system of claim 20 wherein using the received information to load share the processing includes using the received information to load share Diameter message traffic.

31. The system of claim 30 wherein using the received information to load share Diameter message traffic includes using the information to at least one of load share Diameter connection requests and load share Diameter connections.

32. The system of claim 20 wherein the network element includes a peer capacity table (PCT) for maintaining, for each Diameter peer in communication with the network element, a Diameter message capacity requirement of the respective Diameter peer,
wherein the network element uses information stored in the PCT to load share the processing.

33. The system of claim 20 wherein the Diameter message capacity requirement comprises a Diameter message handling capacity associated with an application and wherein using the received information to load share the processing includes using the received information to load share the processing among a plurality of instances of the application.

34. The system of claim 33 wherein using the received information to load share the processing among a plurality of instances of the application includes: using the received information to select an application from the plurality of applications; and directing Diameter message traffic to the selected application.

35. The system of claim 20 wherein using the received information to load share the processing among the plurality of message processors includes: using the received information to select a message processor from the plurality of message processors; and directing Diameter message traffic to the selected message processor.

36. The system of claim 20 wherein at least one of the plurality of message process is configured to use the received information to load share the processing.

37. The system of claim 20 wherein the network element includes a load balancing module separate from the plurality of message processors for using the received information to load share the processing.

38. The system of claim 20 wherein using the received information to load share the processing among the plurality of message processors includes selecting a message processor from the plurality of message processors based on a Diameter message capacity of at least one of the plurality of message processors.

39. A non-transitory computer readable medium having stored thereon executable instructions that when executed by the processor of a computer control the computer to perform steps comprising:
at a network element for processing Diameter messages received from a Diameter peer:
requesting information regarding a Diameter message capacity requirement of the Diameter peer; receiving information regarding the Diameter message capacity requirement of the Diameter peer;
using the received information to load share the processing;
wherein the network element includes a plurality of message processors for processing Diameter messages and wherein using the received information to load share the processing includes using the received information to load share the processing among the plurality of message processors; and
wherein using the received information to load share the processing among the plurality of message processors includes using a message processor capacity table (MCT) for maintaining, for each message processor of the network element, a Diameter message capacity of the respective message processor.

* * * * *